United States Patent Office 3,536,791
Patented Oct. 27, 1970

3,536,791
METHYL ($C_4$-$C_{12}$-ALKYL) BETA,BETA-DICHLOROVINYL PHOSPHATES
Juan G. Morales, Richard R. Whetstone, and Duane K. Hass, Modesto, Calif., assignor to Shell Oil Company, New York, N.Y., a corporation of Delaware
No Drawing. Filed July 21, 1967, Ser. No. 654,993
Int. Cl. C07f 9/08; A01n 9/36
U.S. Cl. 260—957                                    7 Claims

ABSTRACT OF THE DISCLOSURE

Certain methyl ($C_4$-$C_{12}$-alkyl) beta-chlorine-substituted vinyl phosphates, primarily useful as anthelmintics.

BACKGROUND OF THE INVENTION

Field of the invention

This invention relates to novel organophosphorus compounds which are useful as insecticides and as anthelmintics.

Description of the prior art

Dialkyl beta-chlorine-substituted vinyl phosphates are a known class of insecticides (U.S. Pats. 2,956,073, 3,116,201; U.S. Pat. 3,299,190 covering a particular subclass) that also are known to be useful as anthelmintics (U.S. Pats. 3,166,472, 3,318,769; Canadian Pat. 731,113). However, as is pointed out in these latter patents, the phosphates of this class are quite toxic to warm-blooded animals, and their safety factor (ratio of maximum dose tolerated by the host animal to the dose effective to control the parasites) is not as large as could be desired, and according to these patents, safe use of these compounds as anthelmintics requires that they be formulated in a thermoplastic resin which so controls the rate at which the compound is released in the host animal that the parasites are killed without harm to the animal. Further, these anthelmintics as a class have been found to exhibit relatively low activity with respect to tapeworms.

SUMMARY OF THE INVENTION

It now has been found that the group consisting of certain dialkyl beta-chlorine-substituted-vinyl phosphates, in which one alkyl moiety is methyl and the other is one of certain $C_4$-$C_{12}$-alkyl moieties, are markedly superior anthelmintics compared to other members of the general class. The members of this group are highly active anthelmintics, with respect to one or more species of heliminths, yet are relatievly non-toxic to warm-blooded animals. Not only are they intrinsically safer, but they exhibit very large safety factors. The magnitude of the safety factors of these compounds is evident from the fact that these compounds can be safely administered to animals by persons without special training and without exercising more than ordinary care, and without the necessity for special formulation. While the memebrs of the group containing from ten to twelve carbon atoms are less active with respect to roundworms and pinworms, these higher members, and also the member containing nine carbon atoms, are characterized by substantial activity with respect to tapeworms.

DESCRIPTION OF THE PREFERRED EMBODIMENTS

The novel compounds of this invention can be described by the general formula:

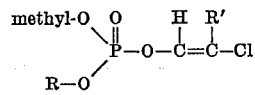

wherein R' represents hydrogen or chlorine and R represents isobutyl or straight-chain alkyl—that is, n-alkyl—containing form six to twelve carbon atoms.

Judging by the available experimental data, it appears that the subgroup wherein R' is chlorine is preferable, as having generally the highest safety factors.

Within this subgroup, two further subgroups appear of particular interests:

(a) That wherein the alkyl moiety contains an odd number of carbon atoms, up to nine. The compounds of this subgroup appear to have the highest safety factors, with the species in which the alkyl moiety is n-heptyl apparently having the highest safety factor of all.

(b) That in which the alkyl moiety contains from ten to twelve carbon atoms. The compounds of this subgroup exhibit substantial activity with respect to tapeworms. In this respect, the species in which the alkyl moiety is n-nonyl also exhibits substantial activity against tapeworms. The most activate with respect to tapeworms is the species wherein the alkyl moiety is undecyl.

The activity of the compounds of this invention with respect to helminth parasites of warm-blooded animals, and their relatively low toxicity with respect to the host animals—that is, their high safety factors—was demonstrated by the following tests:

MAMMALIAN TOXICITY

This is defined as the maximum tolerated dosage, milligrams of test compound per kilogram of animal body weight, and was determined as follows: by intubation a group of mice was treated with a dosage of 500 milligrams of test compound per kilogram of mouse body weight. If any of the mice died, further groups of mice were treated with successively smaller dosages of the test compound, until a dosage was found that all of the mice survived. This is recorded as the maximum tolerated dose.

ANTHELMINTIC ACTIVITY

This is reported as the minimum effective dosage, milligrams of test compound per kilogram of animal body weight, to effect a certain standard of clearance of parasites from the host animal. It was determined in any given case as follows: A group of 5 mice, parasitized by tapeworm (*Hymenolepis nana* and pinworm (*Syphacia obvelata*), was treated, by intubation, with a single dose of the test compound (the dosage being near but less than the maximum tolerated dose. The treated mice were kept from feed and water for 24 hours following treatment, then the mice were sacrificed and the intestinal tract examined for the presence of parasites. If 60% or more of the mice were completely cleared of one and/or the other of the species of parasites, the test was replicated, and if the results were confirmed, additional groups of parasitized mice were treated with successively lower dosages of the test compound, to ascertain the minimum dosage required to clear 60% or more of the mice completely of one and/or the other of the two species of parasites.

SAFETY FACTOR

This is expressed as the ratio of maximum tolerated dose (M.T.D.) to the minimum effective dose (M.E.D.).

Compounds of the invention were evaluated according to this procedure, as were members of the class disclosed in the prior art. The results were as follows:

about 5 milligrams of the anthelmintic per kilogram of the animal body weight, with usual dosages being about 5 to 50 milligrams on the same basis. The maximum dosage, of course, in every case will be determined by the toxicity of the anthelmintic to the host animal. The anthelmintics of this invention provide an excellent safety factor—effectively eradicating endoparasites without ill effect upon the host animal.

Compounds of this invention also are useful insecticides. This was established by means of appropriate tests which established the $LC_{50}$ dosage (dosage in grams of test com-

| Compound | M.T.D. (mg./kg.) | M.E.D. (mg./kg.) Tapeworm | M.E.D. (mg./kg.) Pinworm | Safety factor Tapeworm | Safety factor Pinworm |
|---|---|---|---|---|---|
| Methyl isobutyl 2,2-dichlorovinyl phosphate | 250 | 16 | 2 | 15 | 125 |
| Methyl pentyl 2,2-dichlorovinyl phosphate | 62 | 31 | 2 | 2 | 31 |
| Methyl hexyl 2,2-dichlorovinyl phosphate | 250 | 31 | 4 | 8 | 75 |
| Methyl heptyl 2,2-dichlorovinyl phosphate | >500 | 125 | 4 | >4 | >125 |
| Methyl octyl 2,2-dichlorovinyl phosphate | >500 | 250 | 31 | >2 | >16 |
| Methyl nonyl 2,2-dicholrovinyl phosphate | >500 | 125 | 16 | >4 | >31 |
| Methyl decyl 2,2-dichlorovinyl phosphate | >500 | 62 | 500 | >8 | 1 |
| Methyl undecyl 2,2-dichlorovinyl phosphate | >500 | 31 | 500 | >16 | 1 |
| Methyl dodecyl 2,2-dichlorovinyl phosphate | >500 | 125 | 500 | >4 | 1 |
| Dimethyl 2,2-dichlorovinyl phosphate | 62 | 62 | 31 | 1 | 2 |
| Methyl ethyl 2,2-dichlorovinyl phosphate | 16 | 16 | 16 | 1 | 1 |
| Methyl propyl 2,2-dichlorovinyl phosphate | 125 | 16 | 8 | 7 | 16 |
| Methyl isopropyl 2,2-dichlorovinyl phosphate | 16 | 16 | 16 | 1 | 1 |
| Methyl butyl 2,2-dichlorovinyl phosphate | 31 | 31 | 2 | 1 | 16 |
| Methyl sec-butyl 2,2-dichlorovinyl phosphate | 31 | 31 | 1 | 1 | 31 |
| Methyl isopentyl 2,2-dichlorovinyl phosphate | 31 | 16 | 2 | 2 | 16 |
| Methyl sec-octyl 2,2-dichlorovinyl phosphate | 125 | 125 | 31 | 1 | 4 |
| Diethyl 2,2-dichlorovinyl phosphate | 31 | 16 | 2 | 2 | 16 |
| Dipropyl 2,2-dichlorovinyl phosphate | 125 | 16 | 2 | 7 | 63 |
| Dibutyl 2,2-dichlorovinyl phosphate | 62 | 4 | 2 | 15 | 31 |
| Dipentyl 2,2-dichlorovinyl phosphate | 62 | 62 | 2 | 1 | 16 |
| Dihexyl 2,2-dichlorovinyl phosphate | 250 | 250 | 250 | 1 | 1 |
| Didecyl 2,2-dichlorovinyl phosphate | 500 | 500 | 500 | 1 | 1 |
| Dimethyl 2-chlorovinyl phosphate | 62 | 62 | 62 | 1 | 1 |
| Methyl ethyl 2-chlorovinyl phosphate | 2 | 2 | 1 | 1 | 2 |
| Diethyl 2-chlorovinyl phosphate | 16 | 16 | 16 | 1 | 1 |
| Diisopropyl 2-chlorovinyl phosphate | 62 | 62 | 62 | 1 | 1 |

From the results of these tests, it is clearly evident that the compounds of the invention, while having high anthelmintic activity, have much lower mammalian toxicity, thus having much higher safety factors, as well as higher intrinsic safety.

pound per 100 milliliters of solvent required in the solution or suspension used as a spray, to kill fifty percent of the test insects) of compounds of the invention with respect to several typical species of insects. The results were as follows:

| Compound | $LC_{50}$ dosage for indicate insect | | | | | |
|---|---|---|---|---|---|---|
| | House fly | Pea aphid | Rice weevil | Corn earworm | 2-spotted mite | Anopheles albimanus mosquito |
| Methyl isobutyl 2,2-dichlorovinyl phosphate | 0.0084 | 0.0230 | 0.0059 | 0.0260 | 0.1060 | 0.0026 |
| Methyl pentyl 2,2-dichlorovinyl phosphate | 0.0165 | 0.0093 | 0.0024 | 0.0199 | 0.0275 | 0.0038 |
| Methyl hexyl 2,2-dichlorovinyl phosphate | 0.0640 | 0.0118 | 0.0024 | 0.0250 | 0.0275 | 0.0059 |
| Methyl heptyl 2,2-dichlorovinyl phosphate | 0.0320 | 0.0170 | 0.0032 | 0.0660 | 0.0265 | 0.0105 |
| Methyl octyl 2,2-dichlorovinyl phosphate | 0.0730 | 0.0147 | 0.0110 | 0.0430 | 0.0480 | 0.0280 |
| Methyl nonyl 2,2-dichlorovinyl phosphate | 0.0980 | 0.0203 | 0.0160 | 0.1330 | 0.0560 | 0.0330 |

The compounds of this invention are employed as anthelmintics by the conventional means and techniques employed in the anthelmintic art. The manner in which these compounds are so used is described in detail in copending application Ser. No. 654,985, which is drawn to the use of these compounds as anthelmintics.

The dosage of the anthelmintic is to be used will depend upon the particular kind or kinds of parasites to be controlled, the particular anthelmintic to be used, the kind of host animal, whether the anthelmintic is to be used to cure an already existing infection, or merely as a prophylactic, and the like. These factors are those ordinarily encountered in the treatment of animals to cure and/or prevent their infestation by endoparasites; these factors and their solution all are well known to the practitioners of the art. In general, however, larger dosages are required to cure an already existing infestation than are required for prophylaxis. Thus, dosages of the anthelmintic to provide as little as 1 milligram of the anthelmintic per kilogram of the live body weight of the animal fed at regular intervals—twice daily or daily, for example—may be sufficient to prevent infestation of animals by endoparasites. However, prophylactic dosages ordinarily will amount to about 2–10 milligrams of the anthelmintic per kilogram of the animal body weight. The dosage required to eradicate already existing endoparasites ordinarily will be at least The compounds of this invention can be used for controlling insects, and formulated as necessary for this purpose, according to conventional practices, such as being set out in detail in U.S. Pat. 3,116,201. For example, the compound can either be sprayed or otherwise applied in the form of a solution or dispersion, or it can be absorbed on an inert, finely-divided solid and applied as a dust. Useful solutions for application by spraying, brushing, dipping, and the like, can be prepared by using as the solvent any of the well-known inert horticultural carriers, including neutral hydrocarbons such as kerosense and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, long chain alkyl sulfonates, phenol ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime gypsum, pyrophyllite and similar inert solid diluents. If desired, the compound of the present invention can be employed as an aerosol, as by dispersing the same into the atmosphere by means of a compressed gas.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as an insecticide, the compounds of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine.

The compounds of this invention can be prepared by reacting the appropriate dimethyl alkyl phosphite with chloral or dichloroacetaldehyde, according to the method of U.S. Pat. 2,956,073.

Alternatively, they can be prepared by reacting the appropriate P,P'-di(2,2-dichlorovinyl) P,P'-dimethyl pyrophosphate or corresponding P,P'-di(2-chlorovinyl) P,P'-dimethyl pyrophosphate with the appropriate alkyl alcohol to effect replacement of one of the methyl groups by the alkyl moiety of the alcohol, according to the equation:

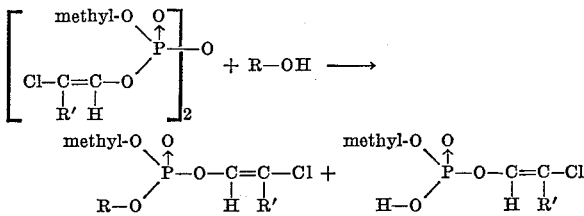

wherein the symbols have the respective meanings already described herein.

This reaction can be carried out by one of two general techniques, the particular technique used being suited to convenience in recovering the desired product. When the alcohol is relatively low-boiling $C_{4-6}$ alcohol), it is most convenient to employ a small excess of the alcohol, since it can be removed readily from the final reaction mixture by distilling the mixture. The distilled mixture then is treated with an organic solvent—methylene chloride is quite suitable—and an aqueous solution of a base—sodium bicarbonate is quite suitable—to give a basic mixture. Under these circumstances, the acid by-product is converted to the sodium salt, which is in the aqueous phase, while the ester product is in the organic solvent phase, from which it can be recovered by distillation.

When the alcohol is relatively high-boiling ($C_{7-12}$ alcohol), it is most convenient to employ a slight excess of the pyrophosphate. In this case, no distillation step is required—all that is necessary to employ the extraction/ neutralization procedure, since the excess pyrophosphate is converted by the base to the sodium salt.

To avoid the possibility of side-reactions and/or decomposition, it is desirable to conduct the reaction at relatively low temperature. The reaction of the pyrophosphate and the alcohol is mildly exothermic. Consequently, it will generally be found best to add the alcohol slowly to the pyrophosphate, with thorough stirring and cooling as necessary to maintain the reaction temperature at about 30–70° C. for from one to three hours (the higher the molecular weight of the alcohol the longer the reaction time needed).

The pyrophosphate precursor can be prepared by reaction methyl hydrogen 2,2-dichlorovinyl phosphate, or the corresponding monochlorovinyl analog or the sodium salts thereof with a large excess of thionyl chloride under reflux conditions, then stripping off the excess thionyl chloride.

The preparation of the pyrophosphate precursor and its conversion to anthelmintics of this invention are described in copending application Ser. No. 654,973. Preparation of the precursor and conversion thereof to the anthelmintics of this invention is demonstrated in the following examples, in which "parts" means parts by weight unless otherwise indicated, with parts by weight bearing the same relationship to parts by volume as does the kilogram to the liter.

EXAMPLE I

Preparation of P,P'-di(2,2-dichlorovinyl) P,P'-dimethyl pyrophosphate (a) Preparation of methyl sodium 2,2-dichlorovinyl phosphate.—Sodium iodide and dimethyl 2,2-dichlorovinyl phosphate, in the molar ratio of 1:1.1 were dissolved in acetone. The solution was refluxed for 30 minutes, then cooled, partially stripped of acetone, and cooled in a Dry Ice/acetone bath. Methyl sodium 2,2-dichlorovinyl phosphate crystallized out, as a white solid melting at 213–214° C., with decomposition. It was identified by elemental analysis, and the identity was confirmed by infra-red spectrum analysis.

(b) Preparation of methyl hydrogen 2,2-dichlorovinyl phosphate.—Methyl sodium 2,2-dichlorovinyl phosphate was dissolved in methanol. A stoichiometrically equivalent amount of anhydrous hydrogen chloride was slowly introduced into the thoroughly stirred solution. The reaction was mildly exothermic, and the reaction mixture was cooled to maintain the mixture at 30° C. After addition of the hydrogen chloride, the mixture was stirred for an additional 15 minutes, then the precipitate of sodium chloride that had formed was filtered off. The liquid phase was stripped of methanol to leave a straw-colored oil, identified by elemental analysis and infra-red spectrum analysis as methyl hydrogen 2,2-dichlorovinyl phosphate.

(c) Preparation of P,P'-di(2,2-dichlorovinyl) P,P'-dimethyl pyrophosphate.—206.97 parts of methyl hydrogen 2,2-dichlorovinyl phosphate were mixed with 750 parts by volume of thionyl chloride, and the mixture was refluxed for 5 hours. The excess thionyl chloride then was stripped off at 45° C. and 20–25 torr. The residue was redissolved in carbon tetrachloride and then was re-stripped first at 45° C. and 20 torr, and then under high vacuum, to leave a straw-colored oil. This was distilled in a molecular still to a kettle temperature of 125° C., 0.0001 torr. The distillate was subjected to elemental analysis:

Analysis (percent by weight): P, 15.0 Cl, 35.1. Calculated analysis for the anhydride: P, 15.7; Cl, 35.9.

The identity of the product was confirmed by infra-red spectrum analysis.

Nuclear magnetic resonance analysis indicated the product to contain 80–90% P,P'-di(2,2-dichlorovinyl) P,P'-dimethyl pyrophosphate.

EXAMPLE II

Preparation of methyl isobutyl 2,2-dichlorovinyl phosphate 39 parts of P,P'-(2,2 - dichlorovinyl) P,P'-dimethyl pyrophosphate, 7.3 parts of isobutyl alcohol and 2 drops of concentrated sulfuric acid were mixed and the mixture heated at 68° C., then permitted to cool slowly to room temperature. Reaction time: 1 hour. The mixture then was diluted with methylene chloride and the resulting mixture washed twice with 50 parts by volume of 10% aqueous sodium carbonate solution. The aqueous washings were combined, and treated twice with 50 parts by volume of methylene chloride. The methylene chloride washings were combined, dried, filtered and stripped of solvent under water aspirator vacuum. The residue was distilled under vacuum, methyl isobutyl 2,2-dichlorvinyl phosphate being obtained as the fraction having a kettle temperature of 115–116° C., head temperature 95–97° C., 0.02 torr. The identity was established by elemental analysis:

*Analysis* (percent by volume).—Calculated: P, 11.8; Cl, 27.0. Found (percent): P, 12.0; Cl, 26.3.

The identity was confirmed by infra-red spectrum analysis. Nuclear magnetic resonance indicated the product to be about 95% methyl isobutyl 2,2-dichlorovinyl phosphate.

EXAMPLE III

Preparation of methyl heptyl 2,2-dichlorovinyl phosphate 87.2 parts of P,P'-di(2,2-dichlorovinyl) P,P'-dimethyl pyrophosphate and 23.3 parts of n-heptyl alcohol were mixed at 21° C. The solution was stirred, whereupon the temperature of the solution rose to 45° C., over a 5-minute period. The mixture then was heated to 70° C. and held there for 2.5 hours. The mixture then was cooled, diluted with methylene chloride to a total volume of about 200 parts by volume and treated with saturated sodium bicarbonate (five times with 40 parts by weight) until no further carbon dioxide evolved. The organic and aqueous phases were separated, the aqueous phase extracted with 200 parts by volume of methylene chloride. The two methylene chloride solutions were combined, dried, treated with celite and absorbent carbon and filtered, then stripped of methylene chloride and the residue distilled in a molecular still, methyl heptyl 2,2-dichlorovinyl phosphate being obtained as the fraction distilling at 90° C. at 0.0001 tor. The identity of the product was determined by elemental analysis:

*Analysis* (percent by weight.—Calculated: P, 10.2; Cl, 23.3. Found (percent): P, 10.3; Cl, 24.1.

The identity was confirmed by infra-red spectrum analysis and by nuclear magnetic resonance, which indicated the product to be about 95% methyl heptyl 2,2-dichlorovinyl phosphate.

We claim as our invention:

1. An organophosphate of the formula:

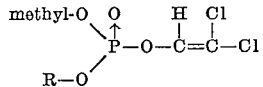

wherein R is isobutyl or straight-chain alkyl of from six to twelve carbon atoms.

2. An organophosphate according to claim 1 wherein R contains an odd number of carbon atoms, up to nine.

3. An organophosphate according to claim 1 wherein R contains from ten to twelve carbon atoms.

4. An organophosphate according to claim 1 wherein R is isobutyl.

5. An organophosphate according to claim 1 wherein R is heptyl.

6. An organophosphate according to claim 1 wherein R is undecyl.

7. An organophosphate according to claim 1 wherein R is octyl.

References Cited

UNITED STATES PATENTS 2,956,073    10/1960    Whetstone _____ 260—957

FOREIGN PATENTS 689,778    5/1967    Belgium.

JOSEPH P. BRUST, Primary Examiner

A. H. SUTTO, Assistant Examiner

U.S. Cl. X.R.

260—933, 971; 424—219